United States Patent
Oh et al.

(10) Patent No.: US 9,016,071 B2
(45) Date of Patent: Apr. 28, 2015

(54) AIR-CONDITIONING APPARATUS FOR ELECTRIC VEHICLE

(71) Applicants: Hyundai Motor Company, Seoul (KR); Kbautotech Co., Ltd., Asan, Chungcheongnam-do (KR)

(72) Inventors: Man Ju Oh, Gyeonggi-do (KR); Jae Woong Kim, Gyeonggi-do (KR); Jae Woo Park, Gyeonggi-do (KR); Jae Hoon Kim, Chungcheongnam-do (KR)

(73) Assignees: Hyundai Motor Company, Seoul (KR); Kbautotech Co., Ltd., Asan, Chungcheongnam-Do (KR)

( * ) Notice: Subject to any disclaimer, the term of this patent is extended or adjusted under 35 U.S.C. 154(b) by 274 days.

(21) Appl. No.: 13/838,482

(22) Filed: Mar. 15, 2013

(65) Prior Publication Data

US 2014/0165609 A1    Jun. 19, 2014

(30) Foreign Application Priority Data

Dec. 14, 2012   (KR) .................. 10-2012-0146847

(51) Int. Cl.
  *F25B 21/02*   (2006.01)
  *B60H 1/00*   (2006.01)

(52) U.S. Cl.
  CPC ......... *F25B 21/02* (2013.01); *F25B 2321/0252* (2013.01); *B60H 1/00478* (2013.01)

(58) Field of Classification Search
  CPC .. F25B 21/02; F25B 2321/0252; F25B 31/00; F25B 1/00; F25B 25/00; F25B 29/00; F25B 30/00; B60H 1/00478
  USPC ........................... 62/3.61, 118, 434
  See application file for complete search history.

(56) References Cited

U.S. PATENT DOCUMENTS

| | | | |
|---|---|---|---|
| 7,363,766 B2* | 4/2008 | Eisenhour ............... | 62/3.61 |
| 2007/0214799 A1* | 9/2007 | Goenka ............... | 62/3.2 |
| 2008/0110179 A1* | 5/2008 | Rice ............... | 62/3.2 |
| 2009/0019861 A1* | 1/2009 | Heckt et al. ............... | 62/3.2 |
| 2010/0155018 A1* | 6/2010 | Goenka et al. ............... | 165/59 |
| 2010/0313576 A1* | 12/2010 | Goenka ............... | 62/3.3 |
| 2011/0120146 A1* | 5/2011 | Ota et al. ............... | 62/3.3 |

(Continued)

FOREIGN PATENT DOCUMENTS

| | | |
|---|---|---|
| JP | 2010-195287 A | 9/2010 |
| JP | 2011-143911 A | 7/2011 |

(Continued)

*Primary Examiner* — Mohammad M Ali
(74) *Attorney, Agent, or Firm* — Mintz Levin Cohn Ferris Glovsky and Popeo, P.C.; Peter F. Corless

(57) ABSTRACT

An air-conditioning apparatus for an electric vehicle, which includes a main core disposed on a ventilation channel, and a thermoelectric device having a first surface and a second surface performing heat generation or heat absorption. An air-conditioning channel through which cooling water circulates around the first surface of the thermoelectric device and the main core is also provided along with a waste heat channel through which the cooling water circulates around the second surface of the thermoelectric device and an electric component A controller configured to control the thermoelectric device so that the first surface and the second surface serve as a heat generating surface and a heat absorbing surface, respectively, and control circulation through the air-conditioning channel or the waste heat channel in a heating mode.

12 Claims, 3 Drawing Sheets

(56) References Cited

U.S. PATENT DOCUMENTS

| | | | |
|---|---|---|---|
| 2012/0067064 A1* | 3/2012 | Danenberg et al. | 62/3.3 |
| 2012/0102974 A1* | 5/2012 | Kawazoe et al. | 62/3.61 |
| 2012/0125013 A1* | 5/2012 | Akiyama et al. | 62/3.2 |
| 2012/0210730 A1* | 8/2012 | Pruett et al. | 62/3.2 |
| 2012/0240882 A1* | 9/2012 | Gao et al. | 123/41.55 |
| 2012/0247126 A1* | 10/2012 | Murase et al. | 62/3.3 |

FOREIGN PATENT DOCUMENTS

| | | |
|---|---|---|
| JP | 2012-192781 A | 10/2012 |
| JP | 2012-214106 A | 11/2012 |
| KR | 10-2008-0008875 A | 1/2008 |
| KR | 10-2009-0062143 | 6/2009 |

* cited by examiner

AIR-CONDITIONING APPARATUS FOR ELECTRIC VEHICLE

CROSS-REFERENCE TO RELATED APPLICATION

This application claims under 35 U.S.C. §119(a) the benefit of Korean Patent Application No. 10-2012-0146847 filed Dec. 14, 2012, the entire contents of which are incorporated herein by reference.

BACKGROUND

1. Field of the Invention

The present invention relates to an air-conditioning apparatus for an electric vehicle, which uses a thermoelectric device rather than a refrigerant 2. Description of the Related Art Conventional air conditioning systems use a refrigerant in a cooling system to cool the air as it passes therethrough. More specifically, the system cools air by rotating a compressor to conduct compression, liquefaction, and evaporation on the refrigerant and heats the air by operating a positive temperature coefficient (PTC) heater. However, the use of refrigerant has added to the effects on global warming Air conditioning systems (including a hot gas system) using the refrigerant require mechanical power, convert electrical energy into mechanical energy, and perform heating and cooling. Thus, mechanical loss as well as quality issues caused by mechanical parts and leakage of the refrigerant are in need of improvement.

An air-conditioning apparatus using thermoelectric devices in related art have been proposed to minimize a temperature difference between opposite surfaces of the thermoelectric device to improve efficiency through the use of a thermoelectric device. However, even on the basis of this technology, an air-conditioning system using cooling water and the thermoelectric device is still only at its rudimentary level. As such, there is a problem associated with the overall heat control of a vehicle, a new system capable of replacing both an existing air-conditioning system and an existing heat-radiating system has yet to be proposed.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention provides an air-conditioning apparatus for an electric vehicle which is capable of operating both an air-conditioning system and a vehicle cooling system using only cooling water with a refrigerant removed from an existing refrigerant-based air-conditioning system.

In order to achieve the above object, according to an aspect of the present invention, there is provided an air-conditioning apparatus for an electric vehicle, which includes a main core disposed on a ventilation channel, a thermoelectric device having a first surface and a second surface performing heat generation or heat absorption, an air-conditioning channel through which cooling water circulates around the first surface of the thermoelectric device and the main core, a waste heat channel through which the cooling water circulates around the second surface of the thermoelectric device and an electric component, and a controller configured to control the thermoelectric device so that the first surface and the second surface serve as a heat generating surface and a heat absorbing surface, respectively, and control circulation through the air-conditioning channel or the waste heat channel, along with the air-conditioning channel in a heating mode.

Here, the air-conditioning apparatus may further include a heat-radiating channel through which the cooling water circulates around the second surface of the thermoelectric device, a radiator, and the electric component In a cooling mode, the controller may control the thermoelectric device so that the first surface and the second surface serve as the heat absorbing surface and the heat generating surface, respectively, and the circulation through the air-conditioning channel and the heat-radiating channel. Further, the heat-radiating channel may be configured to diverge from an output side of the second surface of the thermoelectric device of the waste heat channel, to go through a radiator, and to join at an input side of the electric component According to another aspect of the present invention, there is provided an air-conditioning apparatus for an electric vehicle, which includes a main core and a sub-core disposed on a ventilation channel in an overlapped state, a thermoelectric device having a first surface and a second surface performing heat generation or heat absorption, an air-conditioning channel through which cooling water circulates around the first surface of the thermoelectric device and the main core, a waste heat channel through which the cooling water circulates around the second surface of the thermoelectric device and an electric component, a heat-radiating channel through which the cooling water circulates around the second surface of the thermoelectric device, a radiator, and the electric component, an auxiliary channel through which the cooling water circulates around the second surface of the thermoelectric device, the sub-core, the radiator, and the electric component, and a controller configured to control circulation through the air-conditioning channel and the auxiliary channel during a dehumidifying mode.

Further, the controller may control the thermoelectric device so that the first surface and the second surface serve as a heat generating surface and a heat absorbing surface, respectively, and control circulation through the air-conditioning channel or the waste heat channel along with the air-conditioning channel in a heating mode. When a dehumidifying mode is performed w during the heating mode, the controller may control the thermoelectric device so that the first surface and the second surface serve as the heat generating surface and the heat absorbing surface, respectively, and control circulation through the air-conditioning channel and the auxiliary channel. Also, the controller may control the thermoelectric device so that the first surface and the second surface serve as a heat absorbing surface and a heat generating surface, respectively, and control circulation through the air-conditioning channel and the heat-radiating channel during a cooling mode.

Further, when a dehumidifying mode is performed while the cooling mode is being performed, the controller may control the thermoelectric device so that the first surface and the second surface serve as the heat absorbing surface and the heat generating surface, respectively, and control circulation through the air-conditioning channel and the auxiliary channel. The heat-radiating channel may be configured to diverge from an output side of the second surface of the thermoelectric device of the waste heat channel, to go through the radiator, and to join at an input side of the electric component.

Also, the auxiliary channel may be configured to diverge from a branch point between the output side of the second surface of the thermoelectric device, the heat-radiating channel, and the waste heat channel, to go through the sub-core, and to join at a front end of the radiator of the heat-radiating channel. The waste heat channel may include a first water pump installed at a branch point between the output side of the second surface of the thermoelectric device, the auxiliary channel, and the waste heat channel. In addition, the air-conditioning channel may include a second water pump.

According to the air-conditioning apparatus having the above-mentioned configuration, both an air-conditioning system and a vehicle cooling system can be operated together using only the cooling water with a refrigerant removed from an existing refrigerant-based air-conditioning apparatus. That is, the refrigerant is replaced with the cooling water. Thereby, an environmental effect can be obtained.

The air-conditioning system for an interior of the vehicle as well as the cooling system for an engine is provided, and optimized heat control is performed by a compact system. Thereby, waste heat can be reduced, and waste of energy can be prevented. Furthermore, even in the case of an engine-free electric vehicle, cooling and heating of the same performance as in an existing vehicle may be realized without using a compressor. Using the waste heat of an electric component, the air-conditioning apparatus is effective in energy saving and improvement of fuel efficiency.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION t is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof. As used herein, the term "and/of" includes any and all combinations of one or more of the associated listed items.

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, an air-conditioning apparatus for an electric vehicle according to an exemplary embodiment of the present invention will be described in detail with reference to the accompanying drawings.

Figure 1:
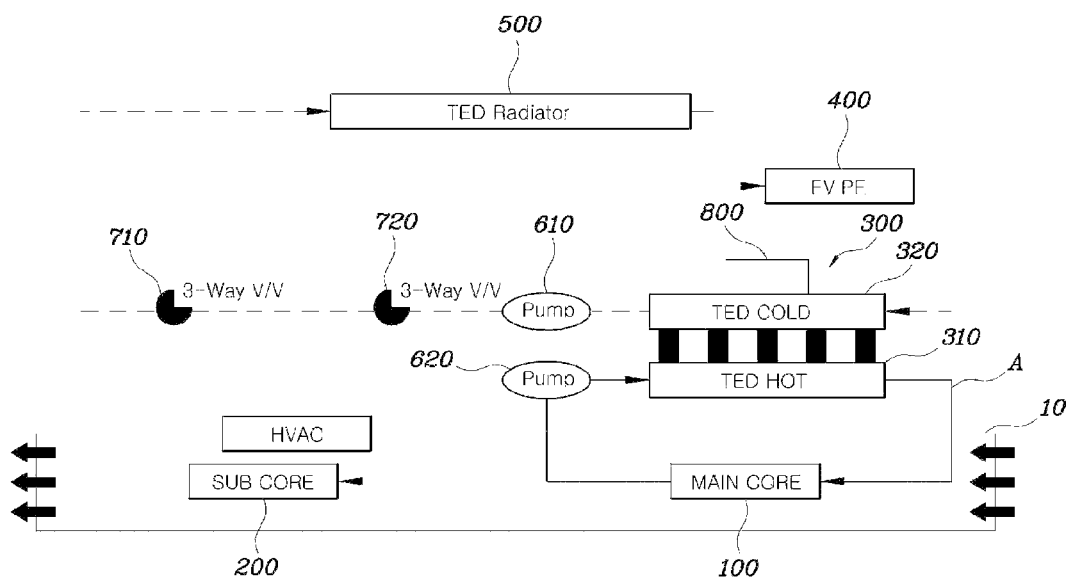
FIG. 1 is a view showing a heating mode in an air-conditioning apparatus for an electric vehicle according to an exemplary embodiment of the present invention.
Figure 2:
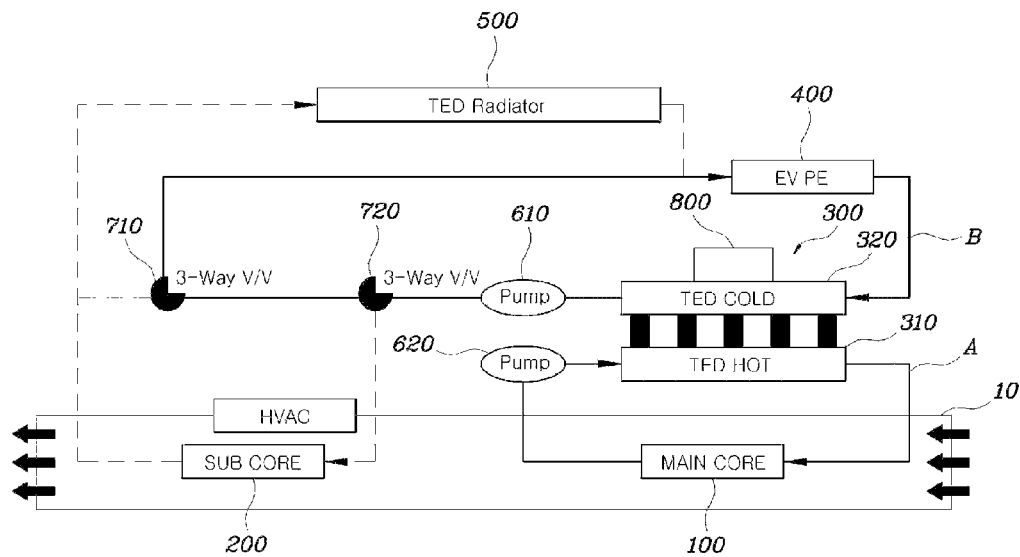
FIG. 2 is a view showing another heating mode in the air-conditioning apparatus for the electric vehicle shown in FIG. 1.
Figure 3:
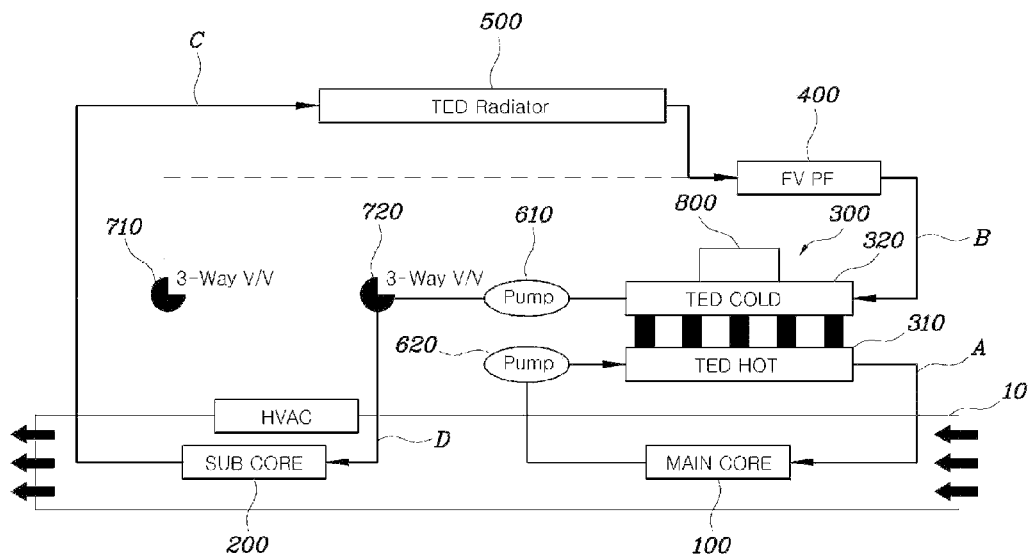
FIG. 3 is a view showing a dehumidifying mode during heating in the air-conditioning apparatus for the electric vehicle shown in FIG. 1.
Figure 4:
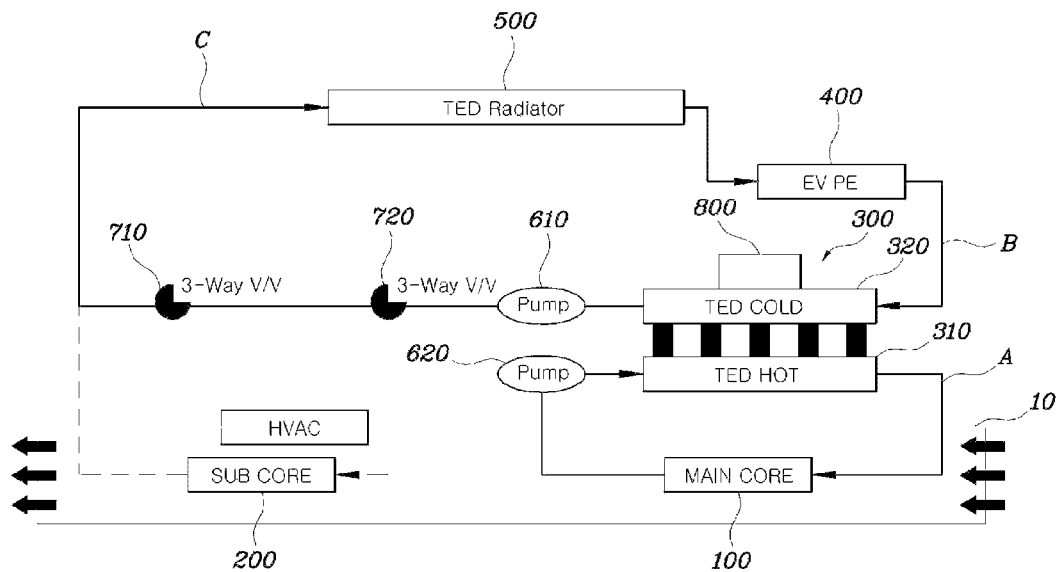
FIG. 4 is a view showing a cooling mode in the air-conditioning apparatus for the electric vehicle shown in FIG. 1.
Figure 5:
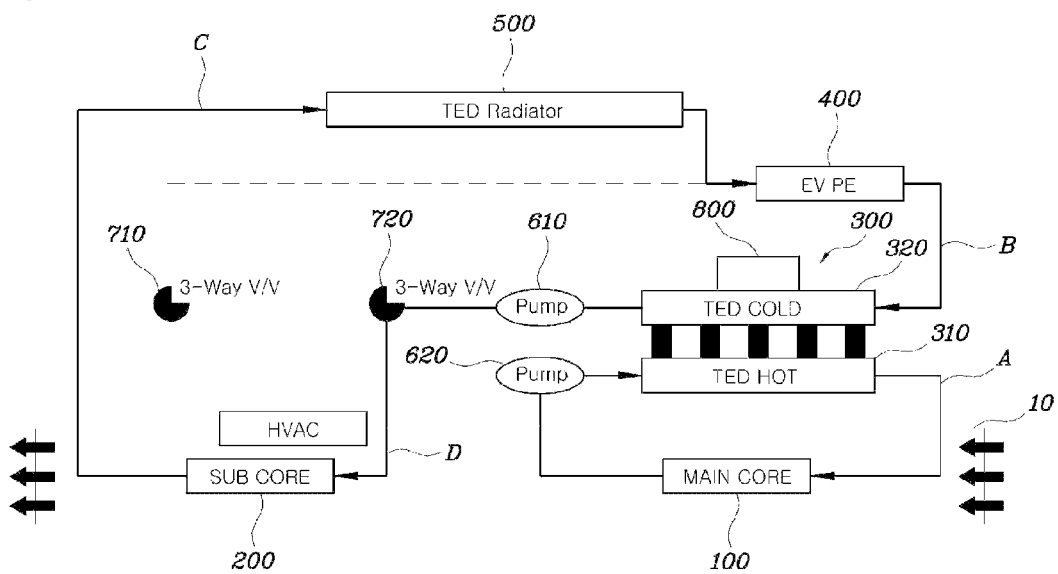
FIG. 5 is a view showing a dehumidifying mode during cooling in the air-conditioning apparatus for the electric vehicle shown in FIG. 1.

FIG. 1 is a view showing a heating mode in an air-conditioning apparatus for an electric vehicle according to an exemplary embodiment of the present invention. FIG. 2 is a view showing another heating mode in the air-conditioning apparatus for the electric vehicle shown in FIG. 1. FIG. 3 is a view showing a dehumidifying mode during heating in the air-conditioning apparatus for the electric vehicle shown in FIG. 1. FIG. 4 is a view showing a cooling mode in the air-conditioning apparatus for the electric vehicle shown in FIG. 1. FIG. 5 is a view showing a dehumidifying mode during cooling in the air-conditioning apparatus for the electric vehicle shown in FIG. 1.

An air-conditioning apparatus for an electric vehicle according to an exemplary embodiment of the present invention includes a main core 100 disposed on a ventilation channel 10, a thermoelectric device 300 having a first surface 310 and a second surface 320 performing heat generation and heat absorption, an air-conditioning channel. A through which cooling water circulates around the first surface 310 of the thermoelectric device 300 and the main core 100, a waste heat channel B through which the cooling water circulates around the other surface 320 of the thermoelectric device 300 and an electric component 400, and a controller 800 controlling the thermoelectric device 300 so that the first surface 310 and the other surface 320 serve as a heat generating surface and a heat absorbing surface, respectively, and controlling circulation through the air-conditioning channel A or the waste heat channel B along with the air-conditioning channel A, in a heating mode.

The air-conditioning apparatus of the present invention for the most part does not use a refrigerant, a compressor, a condenser, etc., as in the related art. However, due to the use of the cooling water, a radiator is required to cool heat-generating parts peculiar to the electric vehicle such as a motor, a battery, etc., without doing hindering vehicle layout as much as possible. Further, a heater core and an evaporator core (i.e., a cooling core) installed on an existing air-conditioning apparatus are also used. In the latter case, the heater core and the evaporator core are functionally separated from each other. One of the two cores may be used as the main core 100, and the other may be used as the sub-core 200. The main core 100 may be used for a main function, i.e., heating and cooling, of the air-conditioning apparatus, and the sub-core 200 may be used for dehumidification to provide counteraction heat.

In an existing air-conditioning apparatus (e.g. a heating, ventilation and air conditioning apparatus (HVAC)), both the main core 100 and the sub-core 200 are provided, and are installed on a ventilation channel 10 for providing an interior of the vehicle with air. The air is adjusted in temperature by a temp door, and then is discharged to the interior. This configuration is equal to that of the air-conditioning apparatus widely known in the related art, and so a detailed description thereof will be omitted.

Meanwhile, to condition the air only with the cooling water, it is necessary to cool or heat the cooling water. To this end, the thermoelectric device is used in place of a compressor. An example of the thermoelectric device includes a Peltier device. It can be understood that the thermoelectric device has the heat generating surface and the heat absorbing surface using electric energy, and operates to pump heat from the heat absorbing surface to the heat generating surface. Thus, the colder the heat absorbing surface, the harder it is to pump heat to the heat generating surface. In contrast, the hotter the heat absorbing surface, the easier it is pump heat to the heat generating surface.

In the case of the present invention, the main core 100 is disposed at the ventilation channel 10 of the existing HVAC. The thermoelectric device 300 having the first surface 310 and the other surface 320 performing heat generation and heat absorption is provided. The first surface 310 of the thermoelectric device 300 and the main core 100 are connected by the air-conditioning channel. A through which the cooling water circulates. Thus, when the first surface 310 of the thermoelectric device 300 generates the heat, the main core 100 also generates the heat, and thus the air is heated. When the first surface 310 of the thermoelectric device 300 is cooled, the main core 100 is also cooled, and thus the air is cooled as a result The waste heat channel B through which the cooling water circulates around the other surface 320 of the thermoelectric device 300 and the electric component 400 is provided. Thus, the heat is radiated from the electric component 400 by the waste heat channel B.

In a heating mode, the controller 800 controls the thermoelectric device 300 so that the first surface 310 and the other surface 320 serve as the heat generating surface and the heat absorbing surface, respectively, and controls the circulation through the air-conditioning channel A or the waste heat channel B along with the air-conditioning channel A.

In detail, in the heating mode, the thermoelectric device 300 is controlled so that electric current is applied thereto and so that the first surface 310 and the other surface 320 serve as the heat generating surface and the heat absorbing surface, respectively. When the circulation through the air-conditioning channel A is performed, that air is heated. This process is applied to the case in which the electric component 400 has not yet been heated.

When the electric component is heated by operation of the vehicle to some extent, the thermoelectric device 300 is controlled so that electric current is applied thereto to use the waste heat of the electric component and so that the first surface 310 and the other surface 320 serve as the heat generating surface and the heat absorbing surface, respectively. Further, the cooling water as well as the waste heat is used to cause the waste heat of the electric component 400 to move to the outer surface 320 of the thermoelectric device 300. Therefore, it can be seen that the thermoelectric device 300 pumps the heat from the other surface 320 to the first surface 310. The waste heat is transmitted to the other surface 320, thereby cooling the electric component 400 and increasing heat efficiency to reduce the air-conditioning load. This leads to an increase in fuel efficiency. Thus, although heating is performed, the operation of the waste heat channel B is selected according to a need to radiate the heat from the electric component 400 or whether the waste heat is generated from the electric component 400, so that the intended effect can be produced.

A heat-radiating channel C through which the cooling water circulates around the other surface 320 of the thermoelectric device 300, the radiator 500, and the electric component 400 is provided. In a cooling mode, the controller 800 controls the thermoelectric device 300 so that the first surface 310 and the other surface 320 serve as the heat absorbing surface and the heat generating surface, respectively, and controls the circulation through the air-conditioning channel A and the heat-radiating channel C.

Further, the heat-radiating channel C may be configured to diverge from an output side of the other surface 320 of the thermoelectric device 300 of the waste heat channel B, to go through the radiator 500, and to join at an input side of the electric component 400. In detail, the radiator 500 is intended to discard the additional waste heat or to further increase efficiency of the thermoelectric device 300. This allows the heat-radiating channel C to diverge from the waste heat channel B to selectively go through the radiator 500.

Thus, when cooling is required, the controller 800 controls the thermoelectric device 300 so that a reversed electric current is applied and so that the first surface 310 and the other surface 320 serve as the heat absorbing surface and the heat generating surface, respectively, and performs the circulation through the air-conditioning channel A, thereby performing the cooling. Particularly, to increase the efficiency of the thermoelectric device 300, it is advantageous to remove the heat from the other surface 320. To this end, the circulation through the heat-radiating channel C is performed, and the heat of the other surface 320 of the thermoelectric device 300 is radiated by the radiator 500. Then, the electric component 400 is cooled.

Meanwhile, an air-conditioning apparatus for a vehicle according to another exemplary embodiment of the present invention includes a main core 100 and a sub-core 200 disposed on a ventilation channel 10 overlapping each other, and a thermoelectric device 300 having first surface 310 and the second surface 320 performing heat generation and heat absorption. An air-conditioning channel A through which cooling water circulates around the first surface 310 of the thermoelectric device 300 and the main core 100 is provided along with a waste heat channel B through which the cooling water circulates around the other surface 320 of the thermoelectric device 300 and an electric component 400. A heat-radiating channel C through which the cooling water circulates around the other surface 320 of the thermoelectric device 300, a radiator 500, and the electric component 400, and an auxiliary channel D through which the cooling water circulates around the other surface 320 of the thermoelectric device 300, the sub-core 200, the radiator 500, and the electric component 400 is also provided. A controller 800 is again configured to control circulation of the cooling water through the air-conditioning channel A and the auxiliary channel D during a dehumidifying mode.

First, FIG. 1 is a view showing a heating mode in an air-conditioning apparatus for an electric vehicle according to an embodiment of the present invention. In the heading mode, the controller 800 controls the thermoelectric device 300 so that the first surface 310 and the other surface 320 serve as a heat generating surface and a heat absorbing surface, respectively, and performs the circulation through the air-conditioning channel A, thereby performing the heating.

FIG. 2 is a view showing another heating mode in the air-conditioning apparatus for the electric vehicle shown in FIG. 1. When waste heat of the electric component is used, the circulation through the waste heat channel B along with the air-conditioning channel A is controlled, thereby allowing the waste heat to be transmitted to an interior of the vehicle.

FIG. 3 is a view showing a dehumidifying mode during heating in the air-conditioning apparatus for the electric vehicle shown in FIG. 1. When a dehumidifying mode during heating is performed, the controller 800 controls the thermoelectric device 300 so that the first surface 310 and the other surface 320 serve as the heat generating surface and the heat absorbing surface, respectively, and controls the circulation through the air-conditioning channel A and the auxiliary channel D. In this case, air ventilated into the interior of the vehicle should be heated and cooled. To this end, the processes f heating are used with no change, and the auxiliary channel D is used in place of the waste heat channel B. Thereby, the dehumidification is realized using the heat generation and absorption of the thermoelectric device 300.

FIG. 4 is a view showing a cooling mode in the air-conditioning apparatus for the electric vehicle shown in FIG. 1. In a cooling mode, the controller 800 controls the thermoelectric device 300 so that the first surface 310 and the other surface 320 serve as the heat absorbing surface and the heat generating surface, respectively, and controls the circulation through the air-conditioning channel A and the heat-radiating channel C. In this case, the circulation through the heat-radiating channel C is performed. As a result, the heat is radiated through a radiator 800. Thus, the cooling efficiency can be increased, and the electric component 400 can be cooled.

FIG. 5 is a view showing a dehumidifying mode during cooling in the air-conditioning apparatus for the electric vehicle shown in FIG. 1. When dehumidification during cooling is requested, a dehumidifying mode is performed while the cooling mode is performed. In this case, the controller 800 controls the thermoelectric device 300 so that the first surface 310 and the other surface 320 serve as the heat absorbing surface and the heat generating surface, respectively, and controls the circulation through the air-conditioning channel A and the auxiliary channel D. Since this is similar to the dehumidification during heating, the first surface 310 is maintained as the heat absorbing surface, and the other surface 320 is maintained as the heat generating surface.

To effectively configure the fluid channels to make the system compact, and to allow the cooling water to effectively circulate, the heat-radiating channel C is configured to diverge from the output side of the other surface 320 of the thermoelectric device 300 of the waste heat channel B, to go through the radiator 500, and to join at the input side of the electric component 400. The auxiliary channel D is configured to diverge from a branch point between the output side of the other surface 320 of the thermoelectric device 300, the heat-radiating channel C, and the waste heat channel B, to go through the sub-core 200, and to join at a front end of the radiator 500 of the heat-radiating channel C.

Thus, the heat-radiating channel C diverges/joins from/with the waste heat channel B so as to be able to selectively go through the radiator 500, and the auxiliary channel D diverges/joins from/with the waste heat channel B so as to be able to selectively go through the sub-core 200. These branch points are provided with 3-way valves 710 and 720. The controller 800 controls the 3-way valves 710 and 720. Thereby, a desired circulation channel of the cooling water can be controlled to be the waste heat channel B, the heat-radiating channel C, and the auxiliary channel D.

Further, the waste heat channel B is provided with a first water pump 610 installed at a branch point between the output side of the other surface 320 of the thermoelectric device 300, the auxiliary channel D, and the waste heat channel B, and a second water pump 620 is installed on the air-conditioning channel A. Thereby, under the control of the controller, the water pumps can be configured to apply a circulation force.

According to the air-conditioning apparatus having the above-mentioned configuration, both an air-conditioning system and a vehicle cooling system can be operated together using only the cooling water with the refrigerant removed from an existing refrigerant-based air-conditioning apparatus. The refrigerant is replaced with the cooling water. Thereby, an environmental effect can be obtained. The air-conditioning system for the interior of the vehicle as well as the cooling system for an engine is provided, and optimized heat control is performed by the compact system. Thereby, the waste heat can be reduced, and the waste of energy can be prevented.

Furthermore, even in the case of t electric vehicles, the cooling and heating of the same performance as in an existing internal combustion vehicle is realized without using the compressor. From the viewpoint of using the waste heat of the electric component, the air-conditioning apparatus is effective in energy savings and improvement of fuel efficiency.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An air-conditioning apparatus for an electric vehicle, comprising:
    a main core disposed on a ventilation channel;
    a thermoelectric device having a first surface and second surface performing heat generation or heat absorption;
    an air-conditioning channel through which cooling water circulates around the first surface of the thermoelectric device and the main core;
    a waste heat channel through which the cooling water circulates around the second surface of the thermoelectric device and an electric component; and
    a controller configured to control the thermoelectric device so that the first surface and the second surface serve as a heat generating surface and a heat absorbing surface, respectively, and control concurrently circulation through the air-conditioning channel and the waste heat channel in a heating mode.

2. The air-conditioning apparatus according to claim 1, further comprising a heat-radiating channel through which the cooling water circulates around the second surface of the thermoelectric device, a radiator, and the electric component, wherein, in a cooling mode, the controller controls the thermoelectric device so that the first surface and the second surface serve as the heat absorbing surface and the heat generating surface respectively, and controls the circulation through the air-conditioning channel and the heat-radiating channel.

3. The air-conditioning apparatus according to claim 1, wherein the heat-radiating channel is configured to diverge from an output side of the second surface of the thermoelectric device of the waste heat channel, to go through a radiator, and to join at an input side of the electric component.

4. An air-conditioning apparatus for an electric vehicle, comprising:
- a main core and a sub-core disposed on a ventilation channel in an overlapped state;
- a thermoelectric device having a first surface and a second surface performing heat generation or heat absorption;
- an air-conditioning channel through which cooling water circulates around the first surface of the thermoelectric device and the main core;
- a waste heat channel through which the cooling water circulates around the second surface of the thermoelectric device and an electric component;
- a heat-radiating channel through which the cooling water circulates around the other surface of the thermoelectric device, a radiator, and the electric component;
- an auxiliary channel through which the cooling water circulates around the second surface of the thermoelectric device, the sub-core, the radiator, and the electric component; and
- a controller configured to control circulation through the air-conditioning channel and the auxiliary channel during a dehumidifying mode.

5. The air-conditioning apparatus according to claim 4, wherein the controller controls the thermoelectric device so that the first surface and the second surface serve as a heat generating surface and a heat absorbing surface, respectively, and controls circulation through the air-conditioning channel or the waste heat channel along with the air-conditioning channel in a heating mode.

6. The air-conditioning apparatus according to claim 5, wherein, when a dehumidifying mode is performed while the heating mode is performed, the controller controls the thermoelectric device so that the first surface and the second surface serve as the heat generating surface and the heat absorbing surface, respectively, and controls circulation through the air-conditioning channel and the auxiliary channel.

7. The air-conditioning apparatus according to claim 4, wherein the controller controls the thermoelectric device so that the first surface and the second surface serve as a heat absorbing surface and a heat generating surface, respectively, and controls circulation through the air-conditioning channel and the heat-radiating channel in a cooling mode.

8. The air-conditioning apparatus according to claim 7, wherein, when a dehumidifying mode is performed while the cooling mode is being performed, the controller controls the thermoelectric device so that the first surface and the second surface serve as the heat absorbing surface and the heat generating surface, respectively, and controls circulation through the air-conditioning channel and the auxiliary channel.

9. The air-conditioning apparatus according to claim 4, wherein the heat-radiating channel is configured to diverge from an output side of the second surface of the thermoelectric device of the waste heat channel, to go through the radiator, and to join at an input side of the electric component.

10. The air-conditioning apparatus according to claim 9, wherein the auxiliary channel is configured to diverge from a branch point between the output side of the second surface of the thermoelectric device, the heat-radiating channel, and the waste heat channel, to go through the sub-core, and to join at a front end of the radiator of the heat-radiating channel.

11. The air-conditioning apparatus according to claim 10, wherein the waste heat channel includes a first water pump installed at a branch point between the output side of the second surface of the thermoelectric device, the auxiliary channel, and the waste heat channel.

12. The air-conditioning apparatus according to claim 11, wherein the air-conditioning channel includes a second water pump.

* * * * *